US008752126B2

(12) United States Patent
Pang et al.

(10) Patent No.: US 8,752,126 B2
(45) Date of Patent: Jun. 10, 2014

(54) METHOD FOR ENHANCING THE SECURITY OF THE MULTICAST OR BROADCAST SYSTEM

(75) Inventors: Liaojun Pang, Shaanxi (CN); Jun Cao, Shaanxi (CN); Manxia Tie, Shaanxi (CN)

(73) Assignee: China IWNComm Co., Ltd, Xi'an (CN)

( * ) Notice: Subject to any disclaimer, the term of this patent is extended or adjusted under 35 U.S.C. 154(b) by 322 days.

(21) Appl. No.: 13/059,547

(22) PCT Filed: Aug. 20, 2009

(86) PCT No.: PCT/CN2009/073372

§ 371 (c)(1),
(2), (4) Date: Feb. 17, 2011

(87) PCT Pub. No.: WO2010/020190

PCT Pub. Date: Feb. 25, 2010

(65) Prior Publication Data

US 2011/0289562 A1  Nov. 24, 2011

(30) Foreign Application Priority Data

Aug. 21, 2008  (CN) .......................... 2008 1 0150693

(51) Int. Cl.
*G06F 7/04* (2006.01)
*G06F 17/30* (2006.01)
*G06F 15/16* (2006.01)
*H04L 29/06* (2006.01)

(52) U.S. Cl.
USPC ................................................ 726/2; 726/4

(58) Field of Classification Search
USPC ......................................................... 726/2, 4
See application file for complete search history.

(56) References Cited

U.S. PATENT DOCUMENTS

2003/0012149 A1* 1/2003 Maggenti et al. ............. 370/260
2003/0220107 A1* 11/2003 Lioy et al. .................. 455/435.1
2005/0010801 A1* 1/2005 Spies et al. ..................... 713/200

FOREIGN PATENT DOCUMENTS

| CN | 1859090 A | 11/2006 |
| CN | 101047956 A | 10/2007 |
| CN | 101162999 A | 6/2008 |
| CN | 101345677 A | 1/2009 |
| WO | WO-2005/001629 | 1/2005 |

OTHER PUBLICATIONS

The Group Diffie-Hellman Problems, Emmanuel Bresson, Olivier Chevassut and David Pointcheval, © Springer-Verlag 2002, 14 pages.*
International Search Report of PCT/CN2009/073372 Dated Dec. 3, 2009 With an English Translation.

* cited by examiner

*Primary Examiner* — Kambiz Zand
*Assistant Examiner* — Benjamin Kaplan
(74) *Attorney, Agent, or Firm* — Venable LLP; Robert Kinberg

(57) ABSTRACT

A method for enhancing the security of the multicast or broadcast system comprises the following steps: after having established the system parameter, the base station receives the register request message transmitted by the terminal, and the register request message carries the device identity information of the terminal; the base station registers the terminal according to the register request message and transmits the authorization key to the terminal after successful registration. By the base station establishing the specific system parameter, generating and awarding the corresponding terminal's key based on the parameter, the embodiment of the present invention can construct a secure network system of multicast or broadcast effectively and solve the security problem of the multicast or broadcast from the base station to the terminal in the network system.

6 Claims, 1 Drawing Sheet

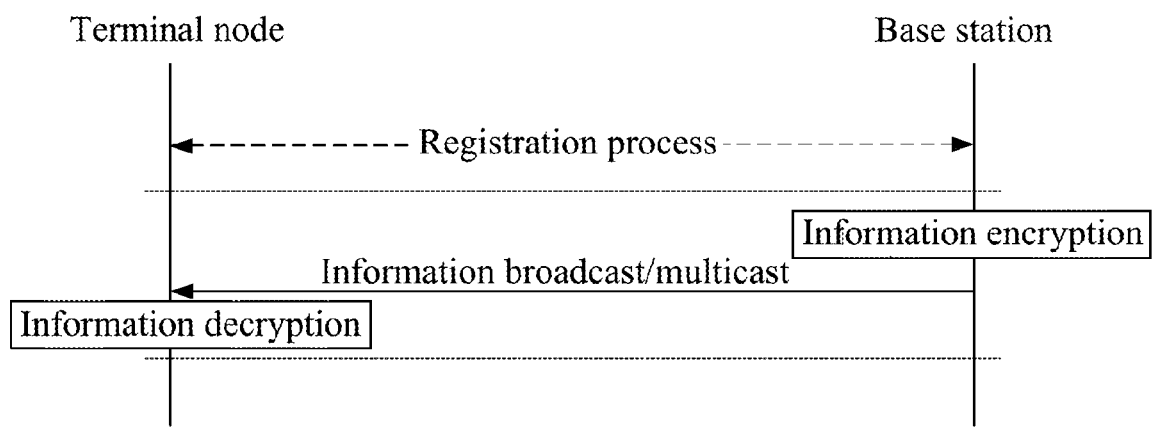

US 8,752,126 B2

METHOD FOR ENHANCING THE SECURITY OF THE MULTICAST OR BROADCAST SYSTEM

CROSS-REFERENCE TO RELATED APPLICATION

The present application is a US National Stage of International Application No. PCT/CN2009/073372, filed on Aug. 20, 2009, designating the United States, and claiming priority to Chinese Patent Application No. 200810150693.7, filed with the State Intellectual Property Office of China on Aug. 21, 2008 and entitled "Method for enhancing the security of the multicast or broadcast system", all contents of the Chinese patent application No. 200810150693.7 is incorporated herein by reference entirely.

FIELD OF THE INVENTION

The present invention relates generally to the technical field of mobile communications and particularly to a method for enhancing the security of a broadcast or multicast system.

BACKGROUND OF THE INVENTION

For current any wireless network, e.g., a wireless local area network, a wireless metropolitan area network, etc., or a wired network, broadcast/multicast is an essential communication mode, and broadcast is one of energy saving communication modes. As a point-to-point uni-cast, the broadcast/multicast also involves a security issue, in the broadcast/multicast, it is necessary to ensure that a broadcast/multicast entity and message is valid and safe, and for a broadcast/multicast receiving terminal, it is also necessary to limit authority so that only the authorized broadcast/multicast receiving terminal can read out the broadcast/multicast message correctly, based on above mention, it is necessary to realize secure distribution in broadcast/multicast.

The standardization organization of Institute of Electrical and Electronics Engineers (IEEE) defined a series of 802.11 standards to enhance the security of a wireless local area network and provide a mobile terminal with a secure access to a base station, and also to support a secure broadcast/multicast service from the base station to the mobile terminal. Also the Chinese national standard GB15629.11 of wireless local area networks, commonly referred to as the Wireless Local Area Network Authentication and Privacy Infrastructure (WAPI) protocol, was published in China in May, 2003 to provide a secure access from the mobile terminal to the base station and support a secure broadcast/multicast service from the base station to the mobile terminal.

In the 802.11 and the WAPI, a broadcast/multicast key is encrypted with predefined uni-cast keys respectively and then encrypted broadcast/multicast keys are distributed. That is, a base station selects a broadcast/multicast key and then encrypts the broadcast/multicast key with corresponding uni-cast keys shared by the base station with mobile terminals, and then the base station distributes encrypted broadcast/multicast keys to the corresponding mobile terminals respectively. After receiving encrypted broadcast/multicast key message, each of the mobile terminals may decrypt the encrypted broadcast/multicast key message by using a corresponding uni-cast key shared with the base station and obtain the broadcast/multicast key. The base station can operate secure broadcast/multicast after all of the terminals obtain the same broadcast/multicast key. The foregoing process has to be repeated if the broadcast/multicast key needs update.

The method at least existing the following drawbacks:

1) in the method, the broadcast/multicast key only could be distributed based on reverse channel, so in some network systems without reverse channel, the broadcast/multicast key cannot be distributed;

2) low security. Since each of the mobile terminals is provided with the same broadcast/multicast key, the broadcast/multicast key is more likely to be revealed by a mobile terminal to other mobile terminal; and 3) low efficiency of an update of the broadcast/multicast key. If the broadcast/multicast key needs be updated, distributing a broadcast/multicast key has to be repeated, that is, the base station selects a broadcast/multicast key and then encrypts the broadcast/multicast key with corresponding uni-cast keys shared by the base station with mobile terminals, and then the base station distributes encrypted broadcast/multicast keys to the corresponding mobile terminals respectively.

The standard of wireless metropolitan area networks proposed by the U.S. IEEE, i.e., the standard of IEEE 802.16, on secure broadcast/multicast issue, also has similar drawbacks. Subsequently a revised solution was provided in the IEEE 802.16e but still has at least the following drawbacks.

1) It also depends on a defined uni-cast key and is inapplicable to a network system offering only a broadcast/multicast service; and 2) managing the broadcast/multicast key via temporal synchronization mode, and statuses management thereof is complicated. In temporal synchronization mode, a new broadcast/multicast key is enabled or disabled depending on temporal judgment; and it is complex to maintain a synchronous clock in a distributed system, managing a large number of system statuses is very complicated.

Apparently a secure broadcast/multicast service which does not depend upon a secure uni-cast channel is of great importance, and therefore it is highly desired to propose a method for distributing and updating a broadcast/multicast key to build a secure broadcast/multicast system

SUMMARY OF THE INVENTION

The invention is intended to build a secure broadcast/multicast network system effectively to realize secure broadcast/multicast from a base station to at least one mobile terminal in a network system.

In accordance with one aspect of the invention, a technical solution of the invention is a method for enhancing security of a broadcast/multicast system, where after defining by a base station system parameters of the broadcast/multicast system, the method includes:

receiving by the base station a registration request message from the mobile terminal, the registration request message contains device identity information of the mobile terminal; and registering by the base station the mobile terminal according to the registration request message and transmitting by the base station an authorized key to the mobile terminal upon successful registration.

Preferably, the method further includes: receiving by the mobile terminal a broadcast/multicast encryption text transmitted from the base station.

Preferably, the method further includes: decrypting by the mobile terminal the broadcast/multicast encryption text with the authorized key.

The operation of defining by a base station system parameters of the broadcast/multicast system includes:

defining two q-order cyclic groups of $(G_1, +)$ and $(G_2, \cdot)$, where q is a prime number, $G_1$ is irreversible in Diffie-Hellman calculation, and P is a generator of $G_1$;

defining e representing bilinear transformation on $G_1$ and $G_2$; and defining $h(\cdot)$ representing a unidirectional hash function.

The operation of registering by the base station the mobile terminal according to the registration request message includes:

verifying, by the base station, physical information of the mobile terminal, and when the mobile terminal complies with the registration request message, selecting by the base station randomly a number n−1 of different elements from $Z^*_q$, where n is an integer larger than or equal to 2, and selecting from $G_1$ and publishing two elements $Q_1$ and $Q_2$;

constructing randomly an (n−1)-order secret polynomial $f(x) \in Z_p[x]$;

calculating $Q_K$ from $Q_K = f(0)P \in G_1$ and $V_i$ from $V_i = f(V_i)P$ (i=0, 1, . . . , n−2) according to the constructed polynomial, where i ranges from 0 to n−2; and extracting the device identity information $ID_x$ from the registration request message, and calculating $V_x$ from $V_x = f(IDx)(Q_1+Q_2)$ according to the device identity information $ID_x$.

the operation of transmitting by the base station an authorized key to the mobile terminal upon successful registration includes:

transmitting the $V_x$ to the mobile terminal.

the operation of receiving by the mobile terminal a broadcast/multicast encryption text transmitted from the base station includes:

acquiring by the base station a broadcast/multicast plain text M, where the broadcast/multicast plain text $M \in G_2$, and encrypting the broadcast/multicast plain text M by the base station to obtain the broadcast/multicast encryption text and then transmitting by the base station the broadcast/multicast encryption text to the mobile terminal.

The operation of encrypting the broadcast/multicast plain text M by the base station includes:

selecting by the base station randomly an element from the group $Z^*_q$ and performing the following calculation:

$$C = (P^*, Q^*_1, U, V^*_0, \ldots V^*_{n-2}) = (rP, rQ_1, e(Q_K, Q_2)^r (T\|M\|h(T\|M)), rV_0, \ldots rV_{n-2}),$$

where C represents the broadcast/multicast encryption text of the broadcast/multicast plain text, and T represents a current time of the broadcast/multicast system.

The operation of decrypting by the mobile terminal the broadcast/multicast encryption text C with the authorized key includes:

constructing by the mobile terminal a set $\Gamma$ by using the system parameter e and the device identity information $ID_x$: $\Gamma = \{e_0, e_1, \ldots e_{n-1}\} = \{v_0, \ldots, v_{n-2}, ID_x\}$;

calculating by the mobile terminal $\sigma_{e_i, \Gamma}$ from $$\sigma_{e_i, \Gamma} = \prod_{e_j \in \Gamma, j \neq i} \frac{e_j}{e_j - e_i}$$

for each $e_i \in \Gamma$;

calculating, from $$T\|M\|h(T\|M) = \frac{e(Q^*_1, Q_K)U}{e\left(Q_1 + Q_2, \sum_{i=0}^{n-2} \sigma_{e_i, \Gamma} V^*_i\right) e(\sigma_{e_{n-1}, \Gamma} V_x, P^*)},$$

$T\|M\|h(T\|M)$ according to the $\sigma_{e_i, \Gamma}$; and comparing calculated $h(T\|M)$ with $h(T\|M)$ transmitted from the base station, and if they are consistent, then determining that M is the broadcast/multicast plain text.

Preferably, the method further includes: determining by the mobile terminal based on the time T whether M is a replay message.

The invention has at least the following advantages.

1. Supporting a broadcast/multicast system without a reverse channel because of no dependency upon a secure uni-cast channel;

2. The security of the algorithm depends upon the elliptic curve discrete logarithm problem, and thus the security is enhanced; and 3. The broadcast/multicast key of each mobile terminal is different from each other, thereby enhancing the security of the broadcast/multicast system.

BRIEF DESCRIPTION OF THE DRAWINGS

FIG. 1 illustrates a schematic diagram of a method for enhancing the security of a broadcast/multicast system according to an embodiment of the invention.

DETAILED DESCRIPTION OF THE EMBODIMENTS

Referring to FIG. 1, the method according to an embodiment of the invention specifically includes the following operations.

According to the embodiment of the invention, firstly a base station defines parameters of a broadcast/multicast system including: two q-order cyclic groups of $(G_1, +)$ and $(G_2, \cdot)$, where q is a prime number, $G_1$ is irreversible in Diffie-Hellman calculation, and P is a generator of $G_1$; e representing bilinear transformation on $G_1$ and $G_2$, i.e., e: $G_1 \times G_1 \to G_2$; and $H(\cdot)$ representing a unidirectional hash function.

The above operation of defining the parameters of a broadcast/multicast system is operated one time, generally speaking the above operation of defining the parameters will not be performed after the parameters of a broadcast/multicast system are well defined.

1) Next a mobile terminal is registered with the base station in a registration process where the mobile terminal is physically registered and authenticated with the base station and is provided an authorized key from the base station;

A broadcast/multicast message encrypted by and transmitted from the base station may be decrypted with the authorized key in a timely way.

The registration process specifically includes the following operations 1.1) to 1.3):

1.1) The base station selects randomly a number n−1 (n is larger than or equal to 2) of different elements $v_0, v_1, \ldots, v_{n-2}$ from a group $Z^*_q$, where $v_0, v_1, \ldots v_{n-2} \in Z^*_q$ and selects elements $Q_1$ and $Q_2$, where $Q_1, Q_2 \in G_1$ and also constructs randomly an (n−1)—order secret polynomial $f(x) \in Z_p[x]$, and subsequently performs the following calculations: $Q_K = f(0)P \in G_1$ and $V_i = f(v_i)P$ (i=0, 1, . . . n−2).

1.2) To register the mobile terminal, the base station firstly verifies physical information of the mobile terminal and records device identity information $ID_x$ of the mobile terminal and then calculates $V_x$ from $V_x = f(IDx)(Q_1+Q_2)$;

1.3) The base station feeds, back to the mobile terminal, registration information including public information ($Q_K$, $Q_1, Q_2, v_0, \ldots, v_{n-2}, V_0, \ldots, V_{n-2}$) and a private key $V_x$, i.e., the authorized key.

2) The base station performs a broadcast/multicast process.

Assumed that the base station broadcasts/multicasts a broadcast/multicast plain text M (M∈$G_2$) for security in the following specific operations 2.1) to 2.3).

2.1) The base station constructs a broadcast/multicast encryption text of the broadcast/multicast plain text by selecting randomly an integer r (r∈$Z^*_q$) and calculating the broadcast/multicast encryption text C:

$$C=(P^*,Q^*_1,U,V^*_0,\ldots V^*_{n-2})=(rP,rQ_1,e(Q_K,Q_2)^r (T\|M\|h(T\|M)),rV_0,\ldots rV_{n-2})$$

where T is a current time of the system, and M is a broadcast/multicast plain text.

2.2) The base stations broadcasts/multicasts the broadcast/multicast encryption text of the broadcast/multicast plain text by broadcasting/multicasting the broadcast/multicast encryption text C to all mobile terminals.

2.3) The mobile terminals decrypt the broadcast/multicast encryption text to obtain the broadcast/multicast plain text.

The mobile terminal decrypts the broadcast/multicast encryption text C to obtain the broadcast/multicast plain text M as follows upon reception of the broadcast/multicast encryption text C.

2.3.1) The mobile terminal constructs a set Γ as follows by using the public information and its own device identity information $ID_x$:

$$\Gamma=\{e_0,e_1,\ldots e_{n-1}\}=\{v_0,\ldots v_{n-2},ID_x\}$$

2.3.2) The mobile terminal calculates $\sigma_{e_i,\Gamma}$ from $$\sigma_{e_i,\Gamma} = \prod_{e_j \in \Gamma, j \neq i} \frac{e_j}{e_j - e_i}$$

for each $e_i \in \Gamma$;

2.3.3) The mobile terminal calculates a message T‖M‖h(T‖M) as follows:

$$T\|M\|h(T\|M) = \frac{e(Q^*_1, Q_K)U}{e\left(Q_1 + Q_2, \sum_{i=0}^{n-2} \sigma_{e_i,\Gamma}V^*_i\right)e(\sigma_{e_{n-1},\Gamma}V_x, P^*)}$$

2.3.4) Finally the mobile terminal determines b whether the message is a replay message based upon the time T, and if so, then the mobile terminal discards the message directly; otherwise, the mobile terminal recalculates h(T‖M) and compares the recalculated h(T‖M) with a received h(T‖M), and if they are unequal in value, then the mobile terminal discards the message directly; otherwise, M is the broadcast/multicast plain text.

The invention claimed is:

1. A method for enhancing security of a broadcast or multicast system, wherein, after defining by a base station system parameters of the broadcast/multicast system, the method comprises:

receiving by the base station a registration request message from a mobile terminal, the registration request message contains device identity information of the mobile terminal; and registering by the base station the mobile terminal according to the registration request message and transmitting by the base station an authorized key to the mobile terminal upon successful registration, wherein, the method further comprises: receiving by the mobile terminal a broadcast/multicast encryption text transmitted from the base station, wherein, the mobile terminal decrypts the broadcast/multicast encryption text with the authorized key, wherein, an operation of defining by a base station system parameters of the broadcast/multicast system comprises: defining two q-order cyclic groups of ($G_1$, +) and ($G_2$, ·), wherein, q is a prime number, $G_1$ is irreversible in Diffie-Hellman calculation, and P is a generator of $G_1$; defining e representing bilinear transformation on $G_1$ and $G_2$; and defining h(·) representing a unidirectional hash function, wherein, an operation of registering by the base station the mobile terminal according to the registration request message comprises: verifying, by the base station, physical information of the mobile terminal, and when the mobile terminal complies with the registration request message, selecting by the base station randomly a number n−1 of different elements from $Z^*_q$, wherein, n is an integer larger than or equal to 2, and selecting from $G_1$ and publishing two elements $Q_1$ and $Q_2$; constructing randomly an (n−1)-order secret polynomial f(x)∈$Z_p$[x]; calculating $Q_K$ from $Q_K$=f(0)P∈$G_1$ and $V_i$ from $V_i$=f($v_i$)P(i=0, 1, ..., n−2) according to a constructed polynomial, wherein, i ranges from 0 to n−2; and extracting the device identity information $ID_x$ from the registration request message, and calculating $V_x$ from $V_x$=f(IDx)($Q_1$+$Q_2$) according to the device identity information $ID_x$.

2. The method of claim 1, wherein, an operation of transmitting by the base station an authorized key to the mobile terminal upon successful registration comprises:

transmitting the $V_x$ to the mobile terminal.

3. The method of claim 2, wherein, an operation of receiving by the mobile terminal a broadcast/multicast encryption text transmitted from the base station comprises:

acquiring by the base station a broadcast/multicast plain text M, where the broadcast/multicast plain text M∈$G_2$, and encrypting the broadcast/multicast plain text M by the base station to obtain the broadcast/multicast encryption text and then transmitting by the base station the broadcast/multicast encryption text to the mobile terminal.

4. The method of claim 3, wherein an operation of encrypting the broadcast/multicast plain text M by the base station comprises:

selecting by the base station randomly an element from the group $Z^*_q$ and performing the following calculation:

$$C=(P^*,Q^*_1,U,V^*_0,\ldots V^*_{n-2})=(rP,rQ_1,e(Q_K,Q_2)^r (T\|M\|h(T\|M)),rV_0,\ldots rV_{n-2}), \text{ wherein,}$$

C represents the broadcast/multicast encryption text of the broadcast/multicast plain text, and T represents a current time of the broadcast/multicast system.

5. The method of claim 4, wherein an operation of decrypting by the mobile terminal the broadcast/multicast encryption text C with the authorized key comprises:

constructing by the mobile terminal a set Γ by using system parameter e and the device identity information $ID_x$:
$\Gamma=\{e_0, e_1, \ldots, e_{n-1}\}=\{v_0, \ldots, v_{n-2}, ID_x\}$;

calculating by the mobile terminal $\sigma_{e_i,\Gamma}$ from $$\sigma_{e_i,\Gamma} = \prod_{e_j \in \Gamma, j \neq i} \frac{e_j}{e_j - e_i}$$

for each $e_i \in \Gamma$;

calculating, from $$T\|M\|h(T\|M) = \frac{e(Q_1^*, Q_K)U}{e\left(Q_1 + Q_2, \sum_{i=0}^{n-2} \sigma_{e_i,\Gamma} V_i^*\right) e(\sigma_{e_{n-1},\Gamma} V_x, P^*)},$$

$T\|M\|h(T\|M)$ according to the $\sigma_{e_i,\Gamma}$; and comparing calculated $h(T\|M)$ with $h(T\|M)$ transmitted from the base station, and if they are consistent, then determining that M is the broadcast/multicast plain text.

6. The method of claim 5, further comprising: determining by the mobile terminal based on the time T whether M is a replay message.

* * * * *